(12) United States Patent
Jury et al.

(10) Patent No.: US 9,401,161 B1
(45) Date of Patent: Jul. 26, 2016

(54) MAGNETIC READ HEAD WITH MULTIPLE READ TRANSDUCERS EACH HAVING DIFFERENT DESIGN CHARACTERISTICS

(71) Applicant: Seagate Technology LLC, Cupertino, CA (US)

(72) Inventors: Jason C. Jury, Minneapolis, MN (US); Ara Patapoutian, Hopkinton, MA (US); Xiong Liu, Singapore (SG); Myint Ngwe, Singapore (SG); Quan Li, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/644,614

(22) Filed: Mar. 11, 2015

(51) Int. Cl.
G11B 5/09 (2006.01)
G11B 5/02 (2006.01)
G11B 20/10 (2006.01)
G11B 15/12 (2006.01)

(52) U.S. Cl.
CPC .............. G11B 5/02 (2013.01); G11B 20/10481 (2013.01); *G11B 15/12* (2013.01); *G11B 15/125* (2013.01); *G11B 20/10009* (2013.01)

(58) Field of Classification Search
None
See application file for complete search history.

(56) References Cited

U.S. PATENT DOCUMENTS

| | | | |
|---|---|---|---|
| 6,104,562 A | 8/2000 | Ottesen et al. | |
| 6,157,510 A * | 12/2000 | Schreck | B82Y 10/00 360/77.06 |
| 7,982,994 B1 * | 7/2011 | Erden | G11B 5/02 360/55 |
| 8,139,301 B1 * | 3/2012 | Li | G11B 5/012 360/39 |
| 8,599,508 B1 * | 12/2013 | Burd | G11B 5/584 360/39 |
| 8,638,513 B1 * | 1/2014 | Burd | G11B 5/012 360/39 |
| 8,837,068 B1 * | 9/2014 | Liao | G11B 5/59688 360/42 |
| 8,913,341 B1 * | 12/2014 | Jury | G11B 20/10046 360/39 |
| 8,947,806 B1 * | 2/2015 | Oenning | G11B 5/012 360/39 |
| 2013/0250447 A1 * | 9/2013 | Erden | G11B 5/4886 360/51 |
| 2013/0286502 A1 | 10/2013 | Erden et al. | |
| 2014/0022877 A1 | 1/2014 | Ong et al. | |
| 2014/0043708 A1 | 2/2014 | Erden et al. | |
| 2014/0139940 A1 * | 5/2014 | Ong | G11B 5/012 360/39 |
| 2015/0194182 A1 * | 7/2015 | Erden | G11B 5/012 360/39 |
| 2016/0035384 A1 * | 2/2016 | Hwang | G11B 20/10046 360/45 |

\* cited by examiner

*Primary Examiner* — Tan X Dinh

(74) *Attorney, Agent, or Firm* — Hollingsworth Davis, LLC (57) ABSTRACT

Data is read from a track of a magnetic recording medium via multiple read transducers located at different positions on a read head. The multiple read transducers are substantially positioned over the track when reading the track. The multiple read transducers have different design characteristics manifesting in differences in at least one of magnetic and electrical behavior of the multiple read transducers. One or more signals originating from the multiple read transducers are combined to assist in decoding the data.

16 Claims, 5 Drawing Sheets

MAGNETIC READ HEAD WITH MULTIPLE READ TRANSDUCERS EACH HAVING DIFFERENT DESIGN CHARACTERISTICS

SUMMARY

The present disclosure is related to a magnetic read head with multiple read transducers each having different design characteristics. In one embodiment, data is read from a track of a magnetic recording medium via multiple read transducers located at different positions on a read head. The multiple read transducers are substantially positioned over the track when reading the track. The multiple read transducers have different design characteristics manifesting in differences in at least one of magnetic and electrical behavior of the multiple read transducers. One or more signals originating from the multiple read transducers are combined to assist in decoding the data.

In another embodiment, receive multiple signals are received from multiple read transducers located at different positions on a read head. The multiple read transducers are substantially positioned over a track of a magnetic recording medium when reading the track. The multiple read transducers have different design characteristics manifesting in differences in at least one of magnetic and electrical behavior of the multiple read transducers. A combination of the one or more of the multiple signals is formed to assist in decoding the data. Each of the one or more signals contributes to the combination according to respective parameters associated with one or more quality measures associated with the multiple signals. The one or more quality measures and the parameters are updated at a time scale that that is orders of magnitude larger than a sample period of the data.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is related to systems, methods, and apparatuses utilizing magnetic readers with multiple read sensors for reading magnetic recording media, e.g., hard disks. Generally, current hard disk devices utilize a read/write head (also referred to as a slider) with a single read transducer for reading data. Multiple read/write heads may be used in one device, e.g., separate read/write heads positioned at top and bottom surfaces of one or more magnetic disks. New architectures are being proposed that use more than one read transducer per read/write head. These new architectures may facilitate recording data at an increased areal density compared to current recording architectures (e.g., perpendicular recording media).

The theoretical maximum areal density of current magnetic recording architectures is bounded by what is known as the superparamagnetic limit. The superparamagnetic limit relates to the tendency of magnetic grains to randomly flip magnetic orientation in response to thermal fluctuations, and defines a lower bound on the area in which an individual bit can be reliably stored. As a result of this superparamagnetic limit, conventional magnetic recording technology is challenged to improve the areal density. Technologies such as heat assisted magnetic recording (HAMR) and bit patterned media (BPM) are being developed to increase areal density beyond what is current possible with perpendicular architectures. However these new technologies come with cost and other technical challenges, so any improvements to conventional recording that enable higher areal density may be utilized as an interim design solution. Utilizing multiple read transducers on a head can be an effective way to improve the areal density for conventional recording in the interim.

A HAMR recording device uses an energy source such as a laser to heat a spot on a high-coercivity medium to locally reduce coercivity during recording. After the spot has cooled, the data is less susceptible to data loss due to thermal fluctuations. A BPM device has a media that is patterned via nanolithography to form magnetic cells used to store bits of data. The use of nanolithography allows for greater areal density than if the cells were defined in a continuous medium by a write transducer.

Another technique to increase storage capacity, known as shingled recording, utilizes drive architectures different from the ones in use today, but may be implemented using existing perpendicular media and conventional (e.g., non-HAMR) read-write heads. Shingled recording involves writing tracks that overlap part of previously written tracks. The write head includes features such as high field strength and sharp corner-edge field that can result in narrower tracks. While this can be achieved using existing writer and media technologies, the architecture needs to take into account potential impact on reading back the narrower tracks.

Whether areal density is increased using HAMR, BPM, or shingled writing, existing read transducers may have difficulty reading back these narrower tracks. For example, shrinking the read transducers in a cross-track direction may decrease signal-to-noise ratio. In the present disclosure, a multiple-sensor magnetic recording (MSMR) scheme is proposed that can take advantage of increased areal density recording techniques. For example, the proposed architecture can read back data that is recording at very small inter-track spacing, which is often expressed in tracks-per-inch (TPI). The MSMR scheme can be used as part of a two-dimensional magnetic recording (TDMR) scheme, in which data from two or more tracks may be processed at once.

Figure 1:
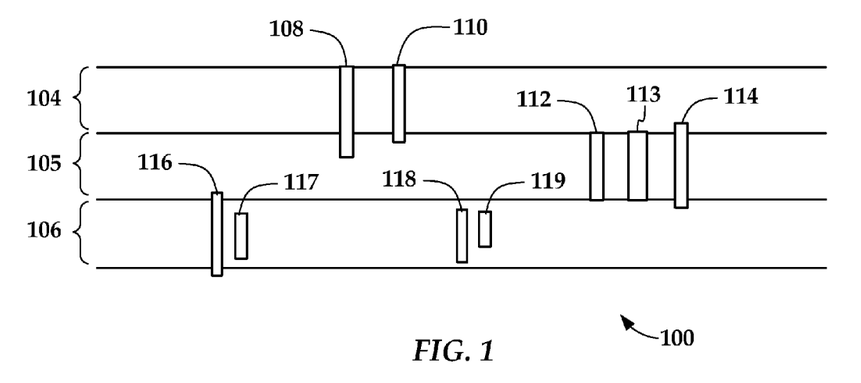
FIG. 1 is a block diagram illustrating reading of data tracks with multiple read heads according to an example embodiment.

In reference now to FIG. 1, a block diagram illustrates an example of an MSMR reader according to an example embodiment. Adjacent tracks 104-106 are written on a magnetic media surface 100. Bits within the tracks 104-106 are sensed by read transducers 108 and/or 110. The read transducers 108, 110 are mounted to a common structure (e.g., a slider, read head, etc.) and are generally arranged to read signals from a single track, track 104 in this example. The read transducers 108, 110 are designed with different characteristics apart from their location that provides signal diversity when reading back data stored on the track 104. As will be described in greater detail below, diverse signals from multiple readers can be combined to improve performance under some conditions.

The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the track 104. A number of parameters in the construction and/or operation of the read transducers 108, 110 can be varied to provide signal diversity.

As shown in FIG. 1, the read transducers 108, 110 may differ by cross-track width. The read transducers 108, 110 are also shown with different cross-track alignment relative to the center of the track 104. Transducer 110 is roughly aligned with the center of the track 104, and track 108 is not. Another example of diversity is shown by another set of read transducers 112-114 according to an example embodiment, which may be mounted to a common structure such as a slider. All the read transducers 112-114 are aligned to the center of track 105. Read transducer 114 has a larger cross-track width than readers 112, 113, and read transducer 113 has a larger down-track thickness (e.g., shield-to-shield spacing) than read transducers 112, 114. In the latter case, this may result in a different resolution of the read transducer 113 compared to read transducer 112, 114. It will be understood that embodiments described herein may utilize two read transducers that have characteristics of any combination read transducers 112-114.

In the previous examples, the read transducers were larger than or about equal to the track width. As indicated by example commonly-mounted read transducers 116, 117 over track 106, at least one of the read transducers may be smaller than the track width. As indicated by example commonly-mounted read transducers 118, 119 also over track 106, both of the read transducers may be smaller than the track width. The transducers 116, 117 are centrally aligned with each other in the cross-track direction, and 118,119 are offset with respect to one another in the cross-track direction. Any of the read transducers shown in FIG. 1 may be centrally aligned or not with other commonly-mounted read transducers on the same mounting structure.

Figure 2:
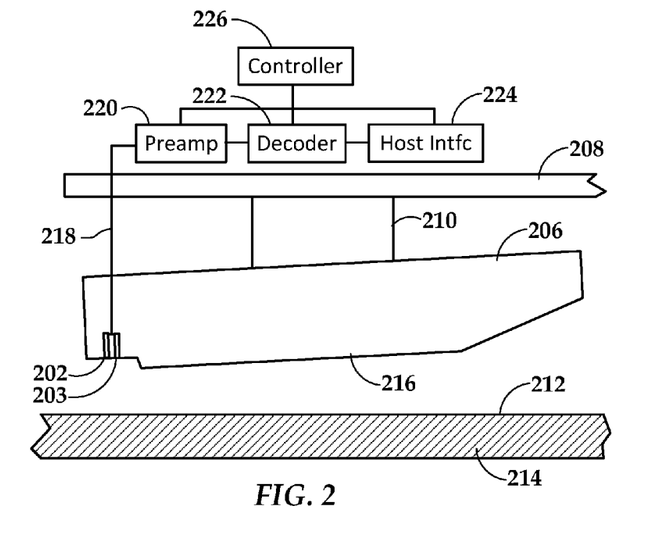
FIG. 2 is a block diagram of a system and apparatus according to an example embodiment.

The read transducers and recording medium shown in FIG. 1 may be included together in a hard disk data storage system that utilizes MSMR. Details of an MSMR system according to an example embodiment are shown in FIG. 2. Generally, first and second read transducers 202, 203 are housed at a trailing edge of a slider 206, also sometimes referred to as a read/write head, read head, recording head, etc. More than two transducers may be used in other embodiments. The slider 206 is coupled to arm 208 by way of a suspension 210 that allows some relative motion between the slider 206 and arm 208. In addition to the read transducers 202, 203, the slider 206 may include one or more write transducers (not shown), such as a write pole and coil. When the slider 206 is located over surface 212 of a recording medium 214 (e.g., magnetic disk), a flying height is maintained between the slider 206 and surface 212 by a downward force of arm 208. This downward force is counterbalanced by an air cushion that exists between the surface 212 and a media-facing surface 216 of the slider 206 when the disk 214 is rotating.

Changes in local magnetic field caused by the moving disk 214 induce a change in resistance of the read transducers 202, 203. The read transducers are coupled to a preamplifier 220 by way of signal lines 218. Generally, the preamplifier 220 amplifies and conditions the analog signals received via signal lines 218. The preamplifier 220 may also provide bias voltages to the read transducers to achieve a desired electrical operating point. The amplified signals received via the preamplifier 220 are used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and/or other logic circuits.

As with the arrangements shown in FIG. 1, the different read transducers 202, 203 in FIG. 2 are intentionally designed and/or configured with different design characteristics. These design characteristics include intentional and statistically significant differences in the average magnetic or electrical characteristics of any of the transducers as a result of the transducers' construction, not including translational differences in position of the transducers on the read head. These characteristics may include different construction parameters (e.g., dimensions, materials, layer arrangement, manufacturing processes, etc.) that introduce sensor diversity into the MSMR system. In some embodiments, one of the different read transducers 202, 203 may be more appropriate to handle a particular impairment in the system, such as impairment in the recording medium, errors during recording, fly height variation, tracking errors, servo errors, etc. A combination of signals from diverse sensors may be able recover sectors that identical (but differently located) sensors cannot.

For example, two read transducers can be designed to have different cross-track widths. Under normal operation in one such arrangement, the wider read transducer may be used by default to read data. In another arrangement, both two read transducers may be used and their signals combined (e.g., averaged), but signals from the wider transducer dominates (e.g., more highly weighted). When tracks are narrow, the narrower read transducer is dominant, so the adjacent track signal is not picked up. In some cases, the wider read transducer is first used and results in significant bit errors, the same track can read a few revolutions by the narrower read transducer then averaged to increase signal-to-noise ratio (SNR). With the option of a narrower read transducer and use of an averaging process, areal density may be significantly increased.

Other factors unrelated to the data may be used to determine which read transducer is dominant at any given time. For example, skew angle and reader separation in the cross-track direction can be used to determine whether the one reader alone or both readers are active and/or dominant. The narrower reader may be dominant when the effective track becomes narrow due to adjacent track erasure or other reasons (e.g., HAMR recording with smaller than desired hotspot or off-center hotspot). A reader with wider and narrower read transducers may be less sensitive to the separation of two readers since wider read transducer works for most cases and narrower read transducer is able to fall into the same track for the times when it is needed.

Figure 3:
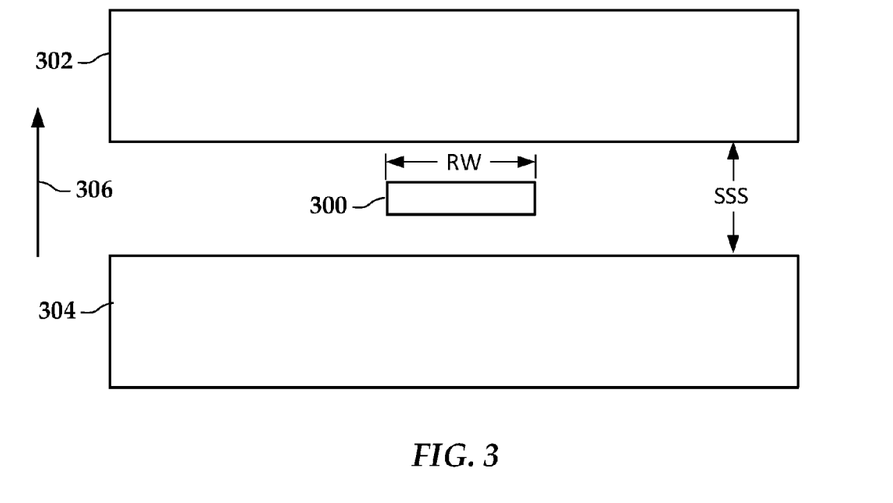
FIG. 3 is a plan view of a read transducer according to an example embodiment.

Another characteristic of read transducers that may be varied to provide signal diversity is down-track signal resolution. The down-track resolution determines the ability of the read transducer to resolve data written at higher linear density. This down-track resolution may be determined in some cases by the spacing between the media and the read sensor (referred to as "head-media-spacing" or HMS) and the separation between the two magnetic shields that sandwich the read sensor (referred to as "shield-to-shield separation" or SSS). In FIG. 3, a block diagram shows view of a read transducer as seen from the media-facing surface according to an example embodiment.

A read sensing element 300 is located between first and second magnetic shields 302, 304. The SSS and reader width (RW) are indicated in the figure. The arrow 306 indicates the down-track direction. The sensing element 300 may include one or more layers of a magnetoresistive sensing stack (e.g., free layer, pinned layer), and intermediary layers (e.g., seed layer, cap layer, etc.) may be located between the sensing element 300 and the shields 302, 304. It will be understood that other parameters (e.g., type of sensing element 300, dimensions of sensing element) may also have an effect on down-track resolution, instead of or in addition to the SSS. By using two or more read transducers with different SSS (or other different construction parameter), the sensors may have other attributes that are different besides resolution (e.g., low-frequency signal amplitude).

Figure 4:
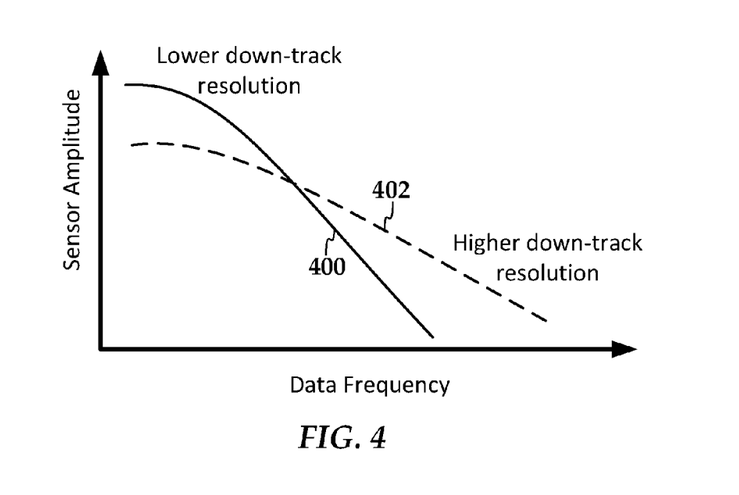
FIG. 4 is a graph illustrating a relation between sensor amplitude and frequency for different read transducers according to example embodiments.

In FIG. 4, a graph shows read transducer amplitude spectrum vs. data frequency (linear density) for two sensors. Curve 400 represents a read transducer with poorer down track resolution (e.g., wider SSS) and curve 402 represents a read transducer with better down-track resolution (e.g., narrower SSS). The read transducer with wider SSS has higher amplitude for low frequencies, but the signal amplitude spectrum decays more quickly as frequency increases. The read transducer with narrower SSS has lower amplitude for low frequencies, but the signal amplitude spectrum decays more slowly. As such, one of two read transducer with differing down-track resolution may perform better under data frequency conditions. For example, the recording medium may be configured with different zones that have different linear data density in the respective tracks. In such a case, a selected one of the read transducer may be used solely to read a particular zone, or combination of the read transducer signals may be weighted more heavily to the selected sensor.

Figure 5:
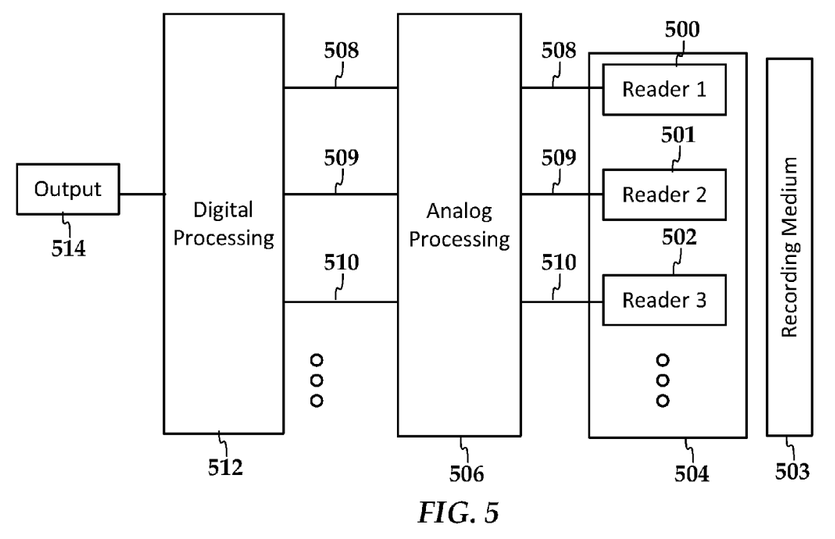
FIG. 5 is a block diagram of a processing apparatus according to an example embodiment.

In FIG. 5, a block diagram illustrates an example data processing path for a storage device according to an example embodiment. Two or more read transducers 500-502 read data from a magnetic recording medium 503. It will be understood that a different number of reader transducers than what is shown may be used, e.g., two, four, etc. The read transducers 500-502 are located at different positions on a read head 504. The read transducers 500-502 are arranged on the read head such that they are substantially positioned over a single track when reading data from the track. In some configurations, some of the read transducers may slightly overlap track boundaries (e.g., such as read transducers 108, 114, and 116 shown in FIG. 1). Even so, the read transducers are generally configured (including size and location during tracking) to minimize adjacent track interference. This is in contrast to arrangements where the transducers are deliberately configured to read more than one track at a time, e.g., simultaneously decoding two tracks. As such, the nominal adjacent track overlap of the transducers may be limited, e.g., to 1%-10% of track pitch, although this amount of overlay may vary at some locations, e.g., extreme skew angles.

The data read by the transducers 500-502 may include both user data and servo data. Generally, servo data is prewritten (e.g., as servo sectors) on the recording medium and assists in correctly locating the read head 504 over the data tracks and provides timing signals used to read the recorded data. User data is written in data sectors between the servo sectors, and may mostly include data recorded by a host. For purposes of this disclosure, user data may also include data written by the apparatus for its own use, e.g., configuration data, error correction data, backup data, etc. As will be described in greater detail below, the processing path may take both types of these data into account to provide improved performance.

The read transducers 500-502 have different construction parameters that result in signal diversity. For example, at least two of the read transducers 500-502 may have different cross-track widths, shield-to-shield spacing, stack construction (e.g., layer thickness, layer arrangement, layer materials), stack type, head-to-media spacing, etc. that result in different performance parameters. Examples of the different performance parameters may include down-track resolution, cross-track coverage, adjacent track interference, signal amplitude, signal-to-noise ratio, frequency response, rise/fall time, reliability, endurance, impedance, etc. Generally, the construction and performance parameters result in one of the read transducers 500-502 having better performance under some conditions, and others of the read head 500-502 having better performance under other conditions.

The read transducers 500-502 are coupled to analog processing circuitry 506 via signal lines 508-510. The analog processing circuitry 506 may include components such as preamplifiers, filters, attenuators, delay elements, etc., that process signals from each of the read transducers 500-502 separately. Output lines 508-510 of the analog processing circuitry 506 are input to digital processing circuitry 512. The digital processing circuitry 512 may include components such as analog-to-digital decoders, digital signal processors and filters, buffers, error correction, digital delay, general-purpose programmable processors, etc. The digital processing circuitry 512 may be configured for one or both of MSMR and TDMR decoding/processing. Generally, the analog signals 508-510 are combined to eventually produce a single digital output signal 514. The combining may occur in either the analog or digital circuitry 506, 512.

Figure 6:
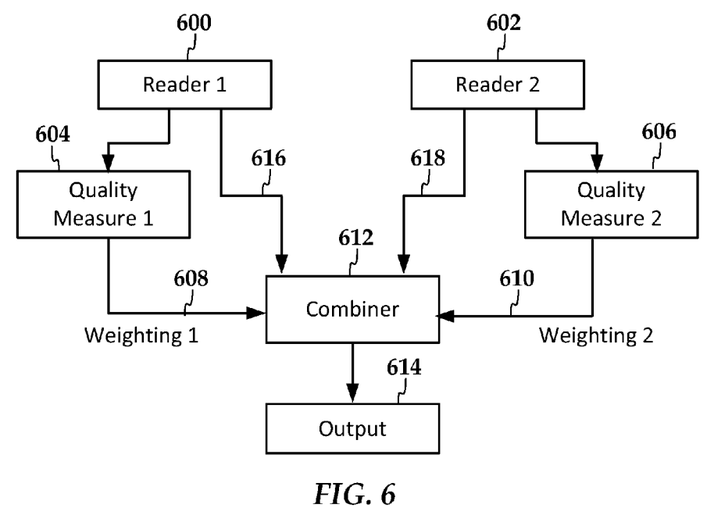
FIG. 6 is a block diagram illustrating signal processing according to an example embodiment.

In FIG. 6, a block diagram illustrates combining of multiple reader signals according to an example embodiment. Read transducers 600, 602 are mounted to a common structure, e.g., read/write head. Quality measurement modules 604, 606 track real time performance of the read transducers 600, 602 and provide an indicator of the signal quality of the associated read transducer 600, 602. The quality indicators may be based on any combination of analog characteristics (e.g., amplitude, SNR, position error signal) and digital characteristics (e.g., bit-error-rate, decoding effort), and may be based on any combination of servo data and user data. The quality indicators may be gathered via modules 604, 606 while actively reading data via one or both of the transducers 600, 602. The quality indicator modules 604, 606 provide weightings 608, 610 used by a combiner module 612.

The combiner module 612 produces an analog or digital output 614 based on combining signals 616, 618 from the read transducers 600, 602 in accordance with the weights 608, 610. For example, weights 608, 610 may be applied to the two reader signals 616, 618 to control their respective contribution according to a quality measure such as SNR, and the signals 616, 618 averaged in accordance with the weights 608, 610 to form the combination 614. If both read transducers 600, 602 are active, their signals may be combined in the channel (e.g., following the preamplifier) by using a multiple-input-single-output (MISO) finite-impulse-response (FIR) equalizer. The MISO-FIR may adapt to minimize the mean-square error between the FIR output and some target signal, using some algorithm like least-mean-square (LMS). Time domain average may be applied to increase SNR by reading the same track for a few revolutions through a narrower read transducer.

In another example, the quality measures determined by the modules 604, 606 include position error signal (PES). Generally, PES is determined by reading servo sectors on the recording medium and is used as a feedback in a servo control system that positions the read/write head. In one embodiment, one or more of the weightings may zero, such that a subset of the read transducers is de-selected. The other weighting would be one if there are two transducers, and may be less than one if more than two transducers are used. For example, when PES for a default read transducer (e.g., wider read transducer) is small, only the default read transducer is used to reduce the power consumption. If PES exceeds a threshold, a second read transducer (e.g., narrower read transducer) may be activated instead of or in addition to the wider read transducer. Thereafter, if PES goes below the threshold, the default read transducer may again be used alone. The use of PES may also be applied to configurations where the signals are combined (e.g., respective first and second weightings between zero and one).

The operations shown in FIG. 6 may be varied based on whether the data being read is servo data or user data. For example, a signal from one of the read transducers 600, 602 may always be used for reading servo data, while a combination of the read transducers 600, 602 may be used for reading the user data. The quality measures may still be based on both reading of servo data and user data. For example, even though a signal from one transducer 600, 602 may be decoded for purposes of servo control, some aspects of the other transducer 600, 602 (e.g., amplitude) may still be monitored while traversing servo sectors, even if data from the other transducer isn't fully processed by the servo controller.

The quality measures determined via modules 604, 606 may be used to perform long-time-scale adjustment of the combiner 612 via weights 608, 610. The combiner 612 may use a state-dependent nonlinear function and/or a time-varying nonlinear function to assist in decoding the data. For example, if the nonlinear functions utilize MISO FIR equalization, the weights 608, 610 may update filter coefficients of the equalizer. These nonlinear functions may perform Viterbi decoding that utilizes data-dependent noise-prediction. As such, the weights may be used to update covariance matrices or other matrices used to determine a branch metric.

Figure 7:
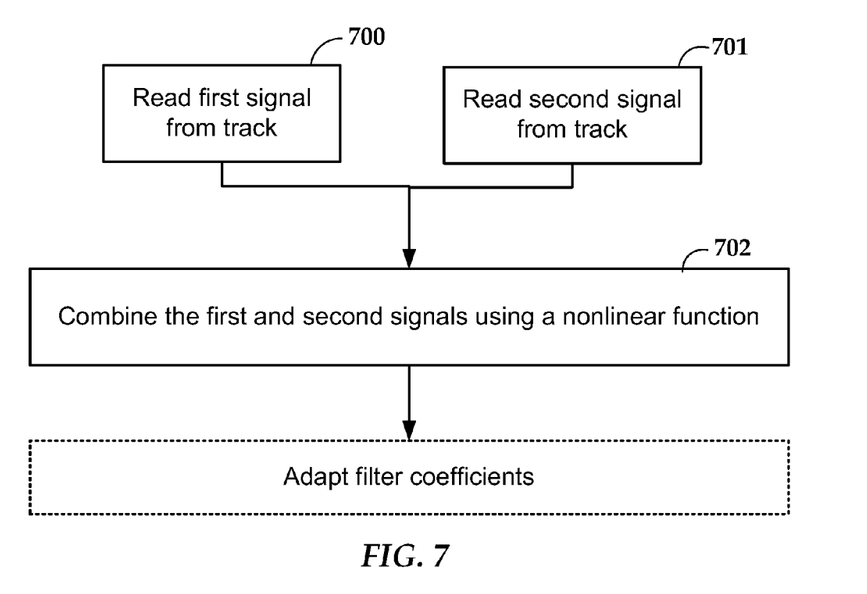
FIG. 7 is a flowchart illustrating a method according to an example embodiment.

In reference now to FIG. 7, a flowchart illustrates a method according to an example embodiment. The method involves reading 700, 701 data (e.g., user data, servo data) from a track of data on a magnetic recording medium via first and second read transducers located at different positions on a read head. The method may use more than two transducers; two are shown here for purposes of illustration. The first and second read transducers are substantially positioned over the track when reading 700, 701 the track. The multiple read transducers have different design characteristics manifesting in differences in at least one of magnetic and electrical behavior of the multiple read transducers. One or more signals originating from the multiple read transducers are combined 702 in accordance with at least one of a state-dependent nonlinear function and a time-varying nonlinear function to assist in decoding the data. The method may optionally involve adapting 702 adapting filter coefficients (e.g., of a MISO-FIR equalizer) to minimize an error between an output of the non-linear functions and a target signal.

As previously noted, the signals from two read transducers may be combined using a MISO FIR based on LMS adaptation algorithm. Assume that signals from the read transducers are first processed by an analog preamplifier, anti-aliasing filter, and other analog pre-processing steps in the channel. Then the signals are processed through an analog-to-digital converter (ADC). The resulting ADC samples corresponding to the m-th read transducer, at sampled time index n, are given by $x^m[n]$. We assume there are M ADC streams total. Each ADC sample stream could correspond to a unique physical read transducer, or multiple ADC streams may be buffered from the original physical read transducers in a more complicated fashion (e.g., suppose there are three physical transducers with different characteristics, and for each transducer we buffer two sets of ADC sample streams from two re-reads of the data; this yields M=6 total ADC streams). These samples may be processed through a discrete-time linear FIR filter, commonly referred to as an equalizer.

Figure 8:
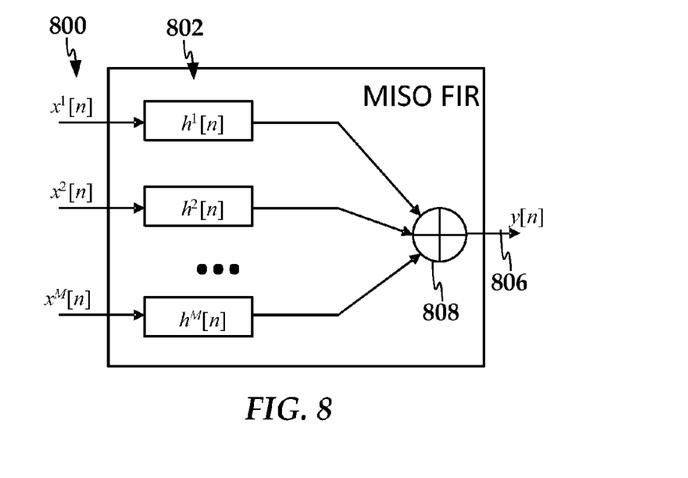
FIG. 8 is a block diagram showing a multiple-input, single output finite impulse response filter according to an example embodiment.

The equalizer is often parameterized to have a specific length of FIR response L, e.g. L=17 means that there are 17 filter coefficients in time (filter impulse response is 17 samples long). In FIG. 8, a block diagram shows an example of the MISO FIR operation. In a MISO FIR structure, each of the M ADC sample streams 800 is first processed individually by respective FIR filters 802 with impulse response $h^m[n]$ (where $h^m[n]=0$ for $n<0$ and $n>L-1$). After each ADC sample stream 800 has been individually filtered by an FIR filter 802, the outputs are summed together via component 808 to form the equalized data stream 806 y[n] as shown below in Equation [1].

$$y[n] = \sum_{m=1}^{M} \sum_{l=0}^{L-1} h^m[l] x^m[n-l]. \quad [1]$$

The LMS algorithm is one method for adapting each of the MISO FIR filter coefficients. This algorithm relies on an error signal e[n], derived from the difference between the actual equalized data stream y[n] and a desired equalized data stream d[n]. The desired equalizer data stream is derived from preliminary or past estimates of the received data, convolved with some assumed (e.g., target) response of the system. The error signal e[n] is related to the incoming ADC samples $x^m[n]$ and the MISO filter coefficients $h^m[n]$ as shown below in Equation [2].

$$e[n] = d[n] - \sum_{m=1}^{M} \sum_{l=0}^{L-1} h^m[l] x^m[n-l] \quad [2]$$

The LMS algorithm for adapting the MISO FIR filter coefficients is desirable because of its simplicity. This algorithm is based on steepest descent approach for minimizing the mean square error. The update rule for the l-th filter coefficient at sampled time index n+1 is therefore given by Equation [3] below. The update gain μ can be determined by trial and error, trading off higher values (for faster updating) with lower values (for improved stability).

$$h^m[l]|_{time\ n+1} = h^m[l]|_{time\ n} + \mu \cdot e[n] \cdot x^m[n-l] \quad [3]$$

The LMS algorithm will automatically adjust the MISO-FIR filter coefficients that control the multiple-reader signal combining to minimize the mean-square error. No explicit user intervention or decision (such as that described in the previous sections) is necessary. Other adaptation algorithms for adjusting MISO-FIR filter coefficients may be applied, such as recursive least squares (RLS).

The process of using a MISO-FIR to combine the multiple signals from differently designed readers is one example of signal combining, where a combined signal is formed by linear combination of the constituent signals. This linear combination is intended to be slowly adapting, for example using LMS adaptation algorithm. Apart from the slow adaptation, the linear combination is generally a convolution with linear time-invariant filters, followed by a summation. For purposes of this discussion, "slow" adaptation involves changing weightings (e.g., filter coefficients of an equalizer) on a time scale that is orders of magnitude larger (e.g., hundreds to thousands of times larger) than the data bit sample period.

For the purposes of illustration, another example of combining can be done as a step in the detection process within a soft-output Viterbi algorithm (SOVA) detector that utilizes data-dependent noise-prediction (DDNP) filters. A SOVA detector computes soft (e.g., likelihood) information used by an error correction code. The DDNP filter utilizes noise predictions based on past and/or future noise samples to reduce noise power. Ideally, noise prediction would result in only the white portion of the noise sample remaining. In practice, even if ideal performance is not obtained, DDNP can lead to significant performance improvements over conventional non-noise predictive channel detectors.

A standard Viterbi detector deals with the accumulation of branch metrics in the process of maximum-likelihood sequence detection (MLSD). For additive white Gaussian noise channel, the branch metric $M_i$ at sampled time instant i is the Euclidean distance between the received signal $r_i$ and the expected (mean) signal $m_i$ and is found as shown in Equation [4] below, where $N_i$ is the estimated noise at sampled time instant i. In most implementations, the received signal is taken at the output of some FIR equalizer. The detected signal would correspond to the lowest accumulated branch metric through the Viterbi trellis.

$$M_i = N_i^2 = (r_i - m_i)^2 \quad [4]$$

In a DDNP-SOVA detector, the branch metric has a more complicated form because of the assumed correlation in noise. Assume the DDNP-SOVA receives a sequence of data samples $r_i, r_{i+1}, \ldots, r_{i+L}$—the corresponding $(L+1) \times (L+1)$ received sample covariance matrix at sampled time index i for an assumed SOVA state z is given by $C_i$. The L×L lower principal sub-matrix of $C_i$ is $c_i$. The (L+1)-dimensional vector $N_i$ is the vector of differences between the received samples $r_i$ and their expected samples $m_i$ (at state z) is found as shown in Equation [5] below. The L-dimensional vector $n_i$ is the last L elements in $N_i$, and is found as shown in Equation [6]. The associated branch metric $M_i$ associated with state z is: found as shown in Equation [7].

$$N_i = [(r_i - m_i) \ldots (r_{i+L} - m_{i+L})]^T \quad [5]$$

$$n_i = [(r_{i+1} - m_{i+1}) \ldots (r_{i+L} - m_{i+L})]^T \quad [6]$$

$$M_i = \log\left[\frac{\det C_i}{\det c_i}\right] + N_i^T C_i^{-1} N_i - n_i^T c_i^{-1} n_i. \quad [7]$$

Assuming the noise process is autoregressive, the branch metric expression above can be simplified by utilizing a prediction error variance $\sigma_i^2$ and noise whitening filter $w_i$. The prediction error variance is defined in Equation [8] below. The noise whitening filter is defined through the relation given in Equation [9] below.

$$\sigma_i^2 = \frac{\det C_i}{\det c_i}, \quad [8]$$

$$C_i^{-1} = \begin{bmatrix} c_i^{-1} & 0 \\ 0 & 0 \end{bmatrix} + \frac{w_i w_i^T}{\sigma_i^2}. \quad [9]$$

With Equations [8] and [9], we can express the branch metric expression as it is most commonly used in DDNP-SOVA application in Equation [10] below.

$$M_i = \log(\sigma_i^2) + \frac{1}{\sigma_i^2}(w_i^T N_i)^2. \quad [10]$$

For each of the various states allowed by the SOVA algorithm, there will be different expected samples $m_i$, different prediction variance $\sigma_i^2$, and different noise whitening filter $w_i$. The branch metric is accumulated as different states are traversed by the various paths in the Viterbi; eventually the path with the lowest accumulated branch metrics will be returned as the "detected signal".

The example in the previous section corresponded to a conventional recording scheme, where a single stream of received signals (e.g., output from a standard single-input/single-output FIR equalizer) originating from a read transducer is used. Of interest here is the combining of the signals from multiple different read transducers. In this section, the DDNP-SOVA branch metric expression is generalized to joint processing of multiple read signals.

As with the MISO-FIR case above, the multiple read signals may correspond to unique read transducers, or may represent re-reads from a (sub)set of read transducers. The received samples for the k-th read signal are $r_i^k, r_{i+1}^k, \ldots, r_{i+L}^k$. Assume that a total of K signals are being jointly processed. The corresponding $K(L+1) \times K(L+1)$ received sample covariance matrix $C_i$ is now a block matrix, as it will consist of $(K+1)K/2$ unique sub-matrices $C_i^{k,l}$ each sized $(L+1) \times (L+1)$ as shown in Equation [11] below.

$$C_i = \begin{bmatrix} C_i^{1,1} & C_i^{1,2} & \ldots & C_i^{1,K} \\ (C_i^{1,2})^T & C_i^{2,2} & \ldots & C_i^{2,K} \\ \vdots & \vdots & \ddots & \vdots \\ (C_i^{1,K})^T & (C_i^{2,K})^T & \ldots & C_i^{K,K} \end{bmatrix} \quad [11]$$

As with a conventional detector with a single stream of signals, the expression for block covariance matrix above still corresponds to a particular state z. The K(L+1)-dimensional vector $N_i$ includes K sub-vectors $N_i^k$ (each dimension L+1) which represent the difference between the received samples $r_i^k$ and their expected values $m_i^k$ (at state z), as shown by Equations [12] and [13] below.

$$N_i = [N_i^1 N_i^2 \ldots N_i^K]^T \quad [12]$$

$$N_i^k = [(r_i^k - m_i^k) \ldots (r_{i+L}^k - m_{i+L}^k)]^T \quad [13]$$

The matrix $c_i$ is now a block matrix, as it includes $c_i^{k,l}$ defined to be the L×L lower principal sub-matrix of $C_i^{k,l}$, as shown in Equation [14]. Also, the KL-dimensional vector $n_i$ includes K sub-vectors $n_i^k$ (each dimension L) which each represent the last L elements in $N_i^k$: as shown in Equations [15] and [16]. With the terms $C_i, c_i, N_i, n_i$ now defined in block form, the same expression for branch metric applied as shown in Equation [17].

$$c_i = \begin{bmatrix} c_i^{1,1} & c_i^{1,2} & \dots & c_i^{1,K} \\ (c_i^{1,2})^T & c_i^{2,2} & \dots & c_i^{2,K} \\ \vdots & \vdots & \ddots & \vdots \\ (c_i^{1,K})^T & (c_i^{2,K})^T & \dots & c_i^{K,K} \end{bmatrix} \quad [14]$$

$$n_i = [n_i^1 n_i^2 \dots n_i^K]^T \quad [15]$$

$$n_i^k = [(r_{i+1}^k - m_{i+1}^k) \dots (r_{i+L}^k - m_{i+L}^k)]^T \quad [16]$$

$$M_i = \log\left[\frac{\det C_i}{\det c_i}\right] + N_i^T C_i^{-1} N_i - n_i^T c_i^{-1} n_i. \quad [17]$$

Completely analogous to the development in section 47 resulting in Equation [10], one can recast the branch metric shown in Equation [17] in the form of a prediction error covariance matrix $\Sigma_i$ and noise-whitening filter matrix $W_i$. This more common form for the branch-metric is given in Equation [18] below.

$$M_i = \log(\Sigma_i) + N_i^T (W_i \Sigma_i^{-1} W_i^T) N_i. \quad [18]$$

The form of this expression is analogous to the conventional branch metric given in Equation [10].

For the sake of illustration, assume K=2 read signals are being processed. Furthermore, we can make use of a block matrix representation for the product $W_i \Sigma_i^{-1} W_i^T$; this representation is given by Equation [19] below.

$$W_i \Sigma_i^{-1} W_i^T = \begin{bmatrix} E_i & F_i \\ F_i^T & G_i \end{bmatrix} \quad [19]$$

The branch metric is then expressed in a block form in Equation [20] below.

$$M_i = \log(\dots) + [(N_i^1)^T \ (N_i^2)^T] \begin{bmatrix} E_i & F_i \\ F_i^T & G_i \end{bmatrix} \begin{bmatrix} N_i^1 \\ N_i^2 \end{bmatrix} \quad [20]$$

In this Equation [20], it can be seen that the branch metric at sample index i (corresponding to a particular state z which yields mean samples $m_i^k$) involves a quadratic function of the noise samples from the two read signals $N_i^1$ and $N_i^2$, as shown below in Equation [21].

$$M_i = \log[\dots] + (N_i^1)^T E_i N_i^1 + (N_i^2)^T F_i^T N_i^1 + (N_i^1)^T F_i N_i^2 + (N_i^2)^T G_i N_i^2 + \dots \quad [21]$$

As the DDNP-SOVA operates on a set of read samples at different times, the underlying matrices $E_i$, $F_i$, and $G_i$ would take on different values corresponding to the different states encountered in the trellis for each candidate path. In this way, the read signals are being processed by a set of time (or state) dependent quadratic functions to form a branch metric. Furthermore, just as LMS adaptation causes a slow change to the MISO-FIR filter coefficients, the prediction error covariance matrix $\Sigma_i$ and the noise-whitening filter matrix $W_i$ (or the sub-matrices $E_i$, $F_i$, and $G_i$) used in the branch metric calculation may also adapt slowly.

It will be understood that the concepts described hereinabove may be applied to any number of read transducers, e.g., more than two. The read signals may originate from a subset of the different read transducers. In this context, a subset refers to a proper subset, such that if the set S has n elements and subset s has m elements, m<n. The signal processing may be done in "real-time" where each read transducer supplies a unique read signal based on a single "pass" at the data of interest for immediate signal processing. In other concepts the read signals may be buffered and collectively processed at a later time (for example, in an error recovery mode using multiple passes at data that is difficult to read). The buffered read signals may originate from a subset of the different read transducers. For example, a signal from some or all of the transducers may be read with errors that result in the data being unrecoverable, the unrecoverable signal being buffered (e.g., saved to memory). The data is re-read and the newly read signal may be combined with the buffered signal in an attempt to decode the data using both sets of data. If N signals are read per pass, this may provide 2N signals for the combination.

The read transducers may reside on different heads, for example in a spin-stand application where multiple sliders are used with heads that reside on separate sliders. The concepts may be similarly applicable to recording systems using multiple writers. For example a slider may include two or more write poles separated from one another in a cross-track and/or down-track direction. The multiple writers may write more than one track at once, or be used, either together or separately (e.g., switched from one to the other), to write a single track.

Figure 9:
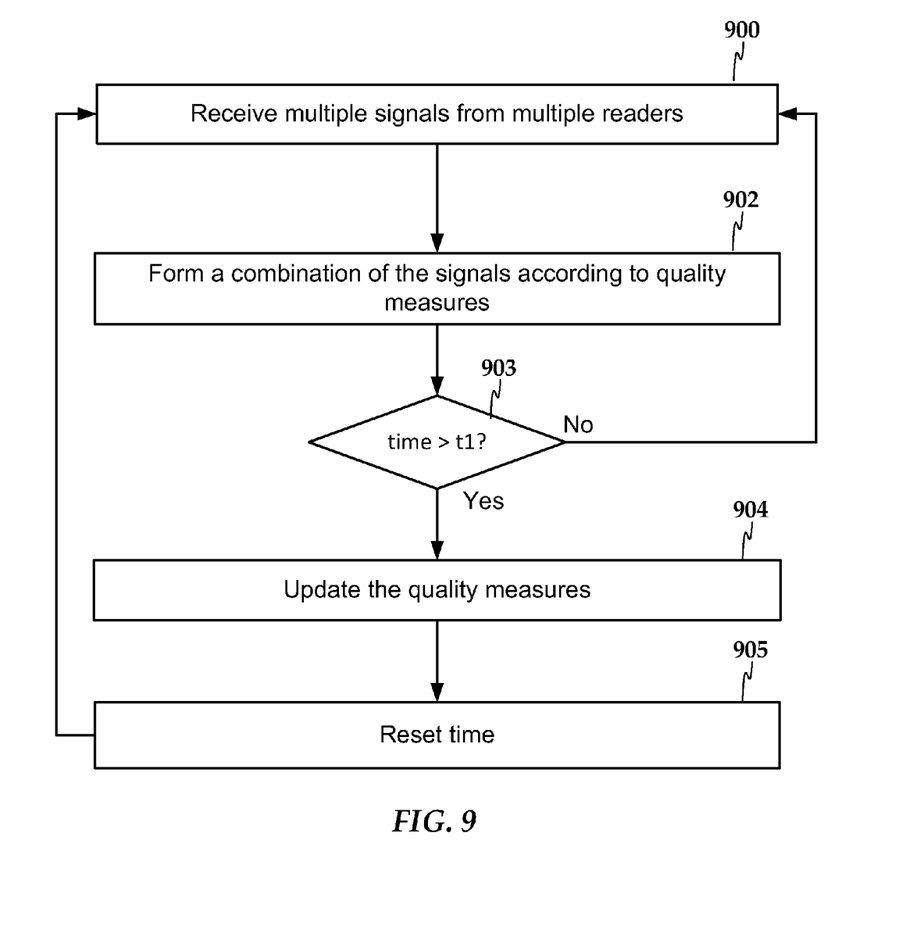
FIG. 9 is a flowchart illustrating a method according to an example embodiment.

In reference now to FIG. 9, a flowchart illustrates a method according to an example embodiment. The method involves receiving 900 multiple signals from multiple read transducers located at different positions on a read head. The multiple read transducers are substantially positioned over a track of a magnetic recording medium when reading the track. The multiple read transducers have different design characteristics manifesting in differences in at least one of magnetic and electrical behavior of the multiple read transducers.

The method further involves forming 902 combination of the one or more of the multiple signals to assist in decoding the data. Each of the one or more signals contributes to the combination according to respective parameters associated with one or more quality measures associated with the multiple signals. The one or more quality measures and the parameters are updated 904 at a time scale (t1) that that is orders of magnitude larger than a sample period of the data. This is indicated by test 903, which compares an elapsed time variable to t1 and performs the update 905 accordingly. After the update 905, the elapsed time variable is reset 905.

In one embodiment, the parameters include weightings associated with each of the multiple signals, and forming 902 the combination involves an averaging of the one or more signals based on the weightings. In another embodiment, the parameters include filter parameters associated with each of the multiple signals. In such a case, forming 902 the combination involves filtering the multiple signals according to the filter parameters and combining the filtered multiple signals. The one or more quality measures in such a case may include an error between the combined filtered signal and a target signal.

In yet another embodiment, the parameters include at least one of a covariance matrix and a noise whitening filter matrix of a DDNP SOVA detector. Forming 902 the combination involves decoding the data using the DDNP SOVA detector using joint processing of the multiple signals. The one or more quality measures in such a case include an accuracy of branch metric computations relative to a target signal during the joint processing.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A system comprising:
   circuitry coupled to receive multiple signals from multiple read transducers located at different positions on a read head, the multiple read transducers substantially positioned over a track of a magnetic recording medium when reading the track, the multiple read transducers having different design characteristics manifesting in differences in at least one of magnetic and electrical behavior of the multiple read transducers; and
   a controller coupled to the circuitry and configured to:
      form a combination of the one or more of the multiple signals to assist in decoding the data, each of the one or more signals contributing to the combination according to respective parameters associated with one or more quality measures associated with the multiple signals; and
      update the one or more quality measures and the parameters at a time scale that is at least an order of magnitude larger than a sample period of the data.

2. The system of claim 1, wherein the parameters comprise weightings associated with each of the multiple signals, and wherein forming the combination comprises an averaging of the one or more signals based on the weightings.

3. The system of claim 1, wherein circuitry comprises a two-dimensional magnetic recording (TMDR) decoder or a multiple sensor magnetic recording (MSMR) decoder, the parameters comprise filter parameters associated with each of the multiple signals, wherein forming the combination comprises filtering the multiple signals according to the filter parameters and combining the filtered multiple signals, and wherein the one or more quality measures comprise an error between the combined filtered signal and a target signal.

4. The system of claim 1, wherein circuitry comprises one of a two-dimensional magnetic recorder decoder and the parameters comprise at least one of a covariance matrix and a noise whitening filter matrix of a data-dependent noise-predictive (DDNP) soft-output Viterbi algorithm (SOVA) detector, wherein forming the combination comprises decoding the data using the DDNP SOVA detector using joint processing of the multiple signals, and wherein the one or more quality measures comprise an accuracy of branch metric computations relative to a target signal during the joint processing.

5. The system of claim 1, wherein the one or more signals comprise a buffered signal of the data and a newly read signal of the same data.

6. A method comprising:
   reading data from a track of a magnetic recording medium via multiple read transducers located at different positions on a read head, the multiple read transducers having different design characteristics manifesting in differences in at least one of magnetic and electrical behavior of the multiple read transducers;
   adaptively filtering multiple signals originating from the multiple read transducers to minimize an error between the combined filtered signal and a target signal, an adaptation of the filtering occurring at a time scale that is orders of magnitude larger than a sample period of the data; and
   combining the filtered multiple signals to assist in decoding the data.

7. The method of claim 6, wherein the multiple signals are filtered using a multiple-input, single-output, finite-input response (MISO FIR) equalizer.

8. The method of claim 7, further comprising adapting filter coefficients of the MISO FIR equalizer to minimize an error between an output of the MISO FIR equalizer and the target signal.

9. The method of claim 8, the error is minimized based at least one of a least-mean-square (LMS) algorithm and a recursive least squares (RLS) algorithm.

10. The method of claim 6, wherein the target signal comprises at least one of preliminary and past estimates of the data.

11. The method of claim 6, wherein the different design characteristics comprise at least one of different cross-track widths, different shield-to-shield spacings, and different down-track resolutions.

12. The method of claim 6, wherein the signals comprise a buffered signal of the data and a newly read signal of the same data.

13. A method comprising:
   reading data from a track of a magnetic recording medium via two or more read transducers located at different positions on a read head, the two or more read transducers substantially positioned over the track when reading the track, the two or more read transducers having different cross-track widths; and
   decoding the data using joint processing of two or more signals originating from the two or more read transducers, the joint processing utilizing branch metric computations; and
   adapting the joint processing to obtain more accurate branch metric computations relative to a target signal, wherein the adaptation of the branch metric computations occurs at a time scale that is orders of magnitude larger than a sample period of the data.

14. The method of claim 13, wherein the branch metric computation is performed in a data-dependent noise-predictive (DDNP) soft-output Viterbi algorithm (SOVA) detector.

15. The method of claim 14, further comprising adapting at least one of a covariance matrix and a noise whitening filter matrix of the DDNP SOVA detector for more accurate branch metric computations relative to a target signal during the joint processing.

16. The method of claim 13, wherein the signals comprise a buffered signal of the data and a newly read signal of the same data.

\* \* \* \* \*